No. 629,712. Patented July 25, 1899.
J. A. COONS.
PULVERIZER.
(Application filed Jan. 22, 1897. Renewed June 17, 1899.)
(No Model.)

Witnesses
W. J. Koerth.
V. B. Hillyard.

Inventor
Joseph A. Coons,
By his Attorneys,
C. A. Snow & Co.

UNITED STATES PATENT OFFICE.

JOSEPH ARIAL COONS, OF CROWLEY, LOUISIANA.

PULVERIZER.

SPECIFICATION forming part of Letters Patent No. 629,712, dated July 25, 1899.

Application filed January 22, 1897. Renewed June 17, 1899. Serial No. 720,972. (No model.)

*To all whom it may concern:*

Be it known that I, JOSEPH ARIAL COONS, a citizen of the United States, residing at Crowley, in the parish of Acadia and State of Louisiana, have invented a new and useful Pulverizer, of which the following is a specification.

This invention aims to lighten the draft of plows and facilitate preparing the land for planting and to combine with a plow of ordinary construction means for cutting the sod or turf and pulverizing clods and lumps.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
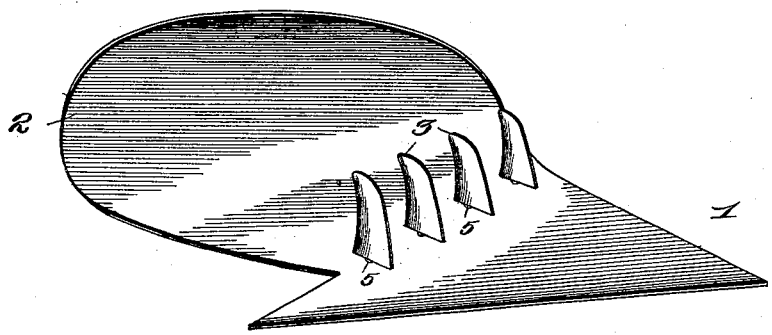
Figure 2:
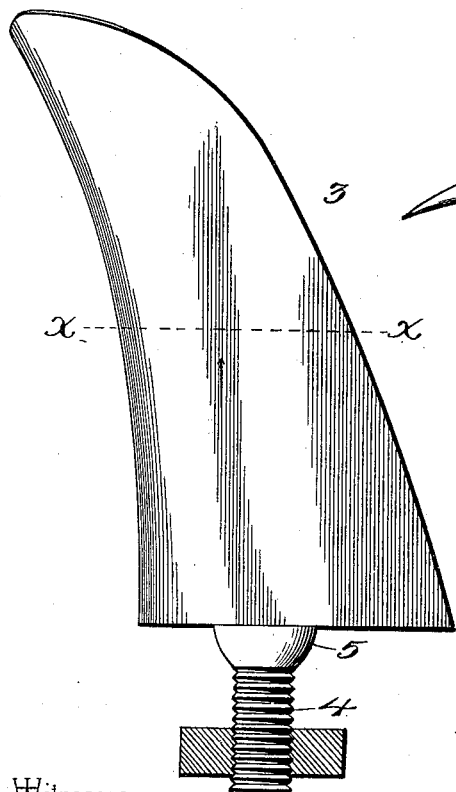
Figure 4:
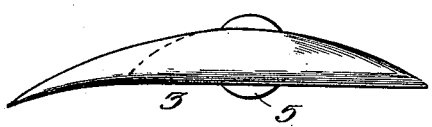
Figure 5:
Figure 3:
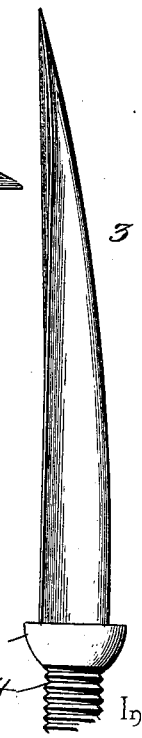

Figure 1 is a perspective view of a plow having the invention applied. Fig. 2 is a side elevation of a cutter. Fig. 3 is a front view of the cutter. Fig. 4 is a top plan view thereof. Fig. 5 is a cross-section about on the line X X of Fig. 2, looking in the direction of the arrow.

Corresponding and like parts are referred to in the following description and indicated in the several views of the accompanying drawings by the same reference characters.

The plow is of ordinary construction and comprises a share 1 and moldboard 2. A series of cutters 3 are located about at the juncture of the share with the moldboard and project vertically, with their front edges curving rearwardly. The number of the cutters will depend upon the size of the plow and the character of the soil to be worked, and the cutters will be arranged transversely of the plow, so as to slice the furrow into strips, thereby pulverizing the soil and cutting the sod or turf. The cutters are similarly shaped and are preferably cast and are formed with threaded shanks 4, which pass through suitable openings in the plow and receive nuts on their lower ends, by means of which they are held in place. The threaded shanks are enlarged at their upper ends, as shown at 5, to sustain the strain of the nuts when the latter are turned, so as to secure the cutters in their adjusted position. Each cutter tapers toward its upper end and curves rearwardly and has the side facing the turn of the furrow flat and the opposite side facing the land side curved between its edges to facilitate the riding of the soil thereover. The upper end portion of the cutter is given a partial twist toward the terminal end of the moldboard, so as to offer as little resistance as possible to the passage of the strips or slices between the cutters. The front edge of the cutters is sharp, so as to pass through sod or turf easily and penetrate clods and otherwise facilitate pulverizing and reducing the land. By having the cutters removably attached to the plow repairs can be readily made and the cutters removed for sharpening or to be replaced by new ones. Experiment has shown that the best results are secured by locating the cutters on a line about corresponding with the juncture of the share with the moldboard, and this position is preferred for this reason.

The length of the cutters in height and on the base-line will depend upon the size of the plow and will vary according to the character of the work to be performed and the style of the plow to which the invention is applied. The enlargement 5 may be omitted and when employed will be countersunk in the face of the plow. The shank will be secured to the plow in any way usually resorted to for connecting parts, either by key or nut.

Having thus described the invention, what is claimed as new is—

1. The combination with a plow, of a series of vertically-disposed cutters arranged about on a line corresponding to the juncture between the share and moldboard, each cutter having the side facing the land side curved between its edges and the opposite side straight, and having the upper end portion twisted slightly toward the terminal end of the moldboard, substantially as set forth for the purpose described.

2. A cutter for a plow of tapering form and curving in its length, and having one side straight and its opposite side curving between its edges, and formed at its lower end with a threaded shank which is enlarged at its upper end and adapted to receive a nut at its lower end, substantially as set forth for the purpose described.

In testimony that I claim the foregoing as my own I have hereto affixed my signature in the presence of two witnesses.

JOSEPH ARIAL COONS.

Witnesses:
PHILIP S. PUGH,
H. R. DUPRE.